June 28, 1938.  M. MALLORY  2,121,921
INTERNAL COMBUSTION ENGINE
Filed March 5, 1937
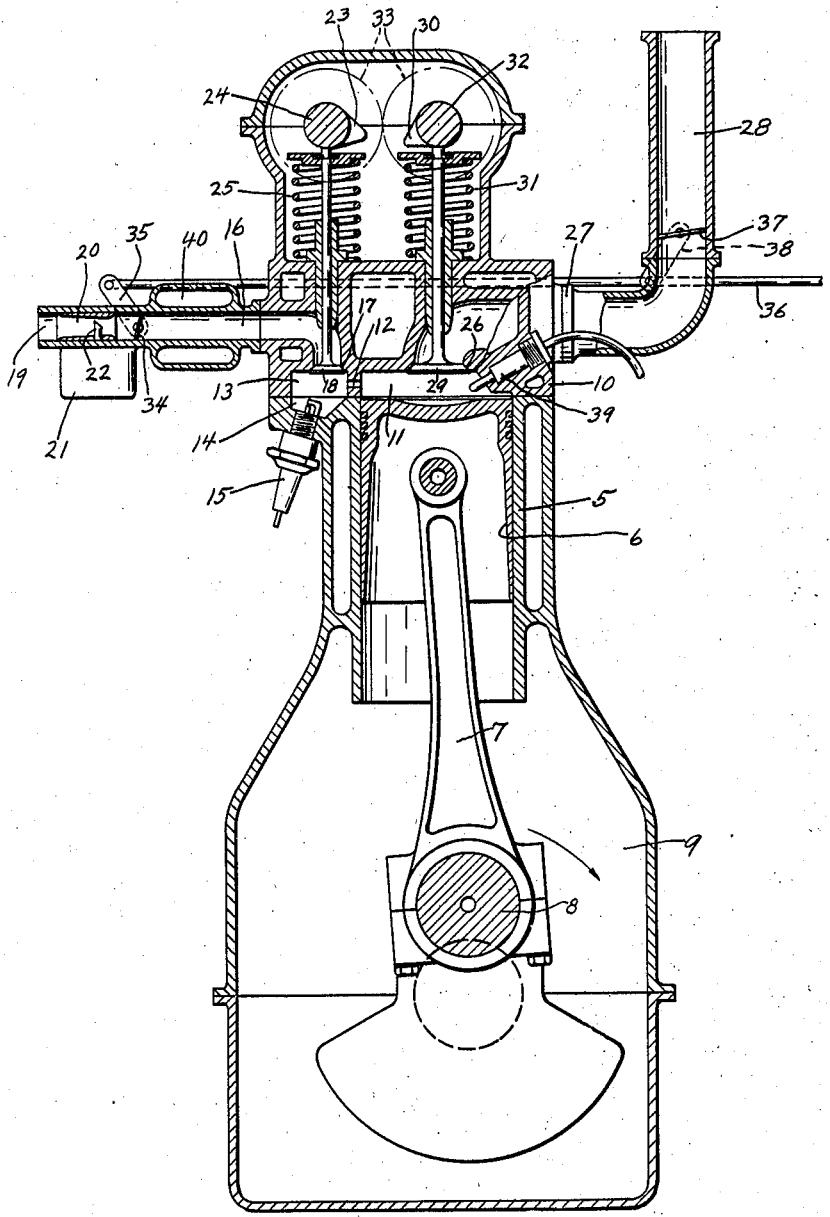
Inventor
Marion Mallory.
By E. N. Lovewell
Attorney Patented June 28, 1938

2,121,921

UNITED STATES PATENT OFFICE 2,121,921

INTERNAL COMBUSTION ENGINE

Marion Mallory, Detroit, Mich.

Application March 5, 1937, Serial No. 129,264

2 Claims. (Cl. 123—32)

This invention relates to improvements in an internal combustion engine of the type which operates on very high compression and in which a charge of liquid fuel is injected under high pressure directly into the top of the cylinder when the piston is at or near the end of its compression stroke.

The invention includes a small primary firing chamber located adjacent the combustion chamber in the upper end of the cylinder and in communication therewith through a restricted port. The primary firing chamber is charged with a normal combustible fuel mixture and is provided with a spark plug for igniting the same. The expansion in the primary firing chamber due to the explosion of the fuel mixture therein causes a flame to be projected at a high velocity through the restricted port into and across the cylinder, thus igniting the charge in the cylinder almost instantaneously.

It is therefore possible to time the ignition much later than in the conventional engine, so that it occurs when the piston is about to start upon its downward or power stroke. The injection of liquid fuel into the cylinder does not take place until the piston is substantially at the end of its compression stroke, so that pre-ignition will be prevented.

One of the objects of the invention is to provide an engine which may be operated on extremely high compression without the possibility of pre-ignition.

Another object is to supply the primary firing chamber from a suitable carburetor with fuel mixture, while the main power charge is supplied in the form of liquid injected directly into the cylinder and may be fuel oil or other low grade fuel.

A still further object is to time the intake valves to the cylinder and the primary firing chamber, so that the latter will be filled with fuel mixture under all operating conditions. At the same time, the restriction between the firing chamber and the cylinder is such as to prevent an excessively high compression in said chamber which might result in pre-ignition, although a very high compression is developed in the cylinder but the injection is late enough to preclude pre-ignition in the latter.

The construction and operation of the invention will be more particularly explained in connection with the accompanying drawing, which is a vertical section taken centrally through one of the engine cylinders, the primary firing chamber and the intake manifolds.
The drawing shows one of the engine cylinders 5 in which a piston 6 is reciprocable by means of a piston rod 7 connected with a crank shaft 8 operating in the usual manner in a crank case 9. It is to be understood that the engine may have any desired number of cylinders. The cylinder head 10 is formed above the cylinder 5 with a combustion chamber 11 connected by a restricted port 12 with a primary firing chamber 13 and the bottom 14 of this chamber, formed in the cylinder block, is adapted to receive a spark plug 15.

Fuel mixture is supplied to the chamber 13 from an intake manifold 16 through an inlet port 17, which is controlled by a valve 18. An air passageway 19 leads to the manifold 16 and is provided with a venturi 20 into which a carburetor 21 is adapted to discharge fuel through a nozzle 22. The valve 18 is adapted to be opened by a cam 23 disposed on a cam shaft 24, which is driven at one half crank shaft speed, and is adapted to be closed by a spring 25.

Air is admitted to the cylinder 5 through an intake port 26 from a manifold 27 which has an air intake 28. The port 26 is controlled by an intake valve 29 which is adapted to be opened by a cam 30 and to be closed by a spring 31. The cam 30 is disposed on a shaft 32, which is connected by gearing 33 to the cam shaft 24 and rotates at the same speed. It will be understood that the main combustion chamber 11 is provided with the conventional exhaust port and valve, but the exhaust gases from the chamber 13, which are a negligible factor in the operation of the engine, are drawn into the cylinder during the intake stroke and dissipated.

A throttle valve 34 is located in the intake passageway leading to the chamber 13, between the nozzle 22 and the intake manifold 16, and is provided with an arm 35 to which the throttle rod 36 is connected. I have also shown an air throttle valve 37 located in the air intake passageway 28 and having an arm 38 connected to the throttle rod 36 so that it opens and closes in synchronism with the throttle valve 34. If desired, the valve 37 may be omitted and the engine will then operate with a constant compression.

An injector 39 is located in the cylinder head 10 and discharges a so-called solid charge of liquid fuel into the combustion chamber 11. The compression at the time of injection, especially when the valve 37 is open or omitted altogether, is not as high as in a Diesel engine, which would cause self-ignition, but is much higher than in the conventional engine. In the Diesel engine, accurate timing of the ignition is impossible and, if the compression in one of the cylinders is not high enough, because of a defective valve or for some other reason, the charge therein will not be ignited and the engine will miss, whereas in my engine, accurate timing is possible and the flame projected from the primary firing chamber, which is very hot and of high velocity, causes complete and positive combustion in the main combustion chamber of the cylinder almost simultaneously with the occurrence of the spark in the chamber 13.

Engines heretofore constructed, in which liquid fuel is injected into the cylinder and the charge ignited by an electric spark, do not operate on extremely high compression. The injection usually starts to take place when the piston is from 40° to 60° from top dead center on its compression stroke, and if the compression were extremely high, pre-ignition would occur. In my engine constructed in accordance with the present invention, the injection starts to take place when the piston is at or near top dead center, which is much later than in the usual spark-ignited injection engines. The spark occurs in the chamber 13 almost simultaneously with the injection of liquid fuel into the cylinder. Only a very little spark advance is necessary, since the flame from the small combustion chamber 13 causes more rapid burning of the mixture.

If the valve 37 is used, the compression will of course be lower than when it is omitted and will vary with variations of the throttle. With lower compression, the timing of the injection of liquid fuel into the cylinder may be in advance of the spark without risk of pre-ignition.

It is to be noted, too, that the valves 34 and 27 are connected so that they open and close in unison, thus synchronously controlling the volume of the charges to both the main chamber 11 and the primary firing chamber 13. This synchronous control is necessary in order to insure the correct relative pressures in the two chambers.

It is important that, under all operating conditions, the chamber 13 be substantially filled with a combustible fuel mixture. It is therefore desirable to set the cam 30 in advance of the cam 23, particularly if the valve 37 is omitted and the engine is operating with substantially constant compression. Then, if the valve 29 closes when the piston is near the end of its intake stroke, there will be a sudden increase of vacuum in the cylinder which will draw fuel mixture from the carburetor 21 into the chamber 13 and fill the same. This insures a hot flame when the spark occurs, resulting in complete and substantially instantaneous combustion in the cylinder.

Due to the fact that the flame from the primary firing chamber causes more instantaneous combustion, I desire to locate the cylinder off-center from the crank so that the expansion forces will have a greater leverage over the crank per degrees of travel. For example, if the cylinder were set directly over center with reference to the crank shaft, it would not have as much leverage over the crank shaft in 10° travel as it would if it were offset. Of course, it is important on which side the cylinder is offset. In this case, where the crank rotates clockwise, the cylinder should be offset to the left from the center, or opposite to the direction of rotation. Then, 10° travel of the crank shaft gives the piston a greater leverage over the crank shaft. This is very important where the combustion is more instantaneous, because the explosion, being of a shorter dwell, should occur when the piston has greater leverage. Claims to this feature are not made in the present application, but are presented in my co-pending application, Serial Number 138,641, filed April 23, 1937. If, however, ignition is used which causes the mixture to burn more slowly, the cylinder should be offset to the right of the crank shaft, or in the same direction as the crank shaft rotation. In such case, the crank would have to travel a greater number of degrees before the piston would have leverage over it. This latter expedient is common practice among other manufacturers where weak ignition and slow burning mixtures are used.

There is only a comparatively small amount of fuel used in the small chamber 13. This is primarily for igniting the injection charge in the cylinder, but will ordinarily be sufficient to idle the engine, even if no charge of fuel is injected into the cylinder. Thus a smooth idling is possible, which is not generally the case in a high compression engine.

While I have suggested gasoline to be used in the small carburetor 21, it will be noted that there is a comparatively large heat chamber 40 around the manifold 16. By the use of this heat chamber it is possible to use a heavier grade of fuel in the carburetor, as well as for the charge that is injected into the cylinder.

From the foregoing description, it will be seen that the invention provides an engine which may be operated with greater economy and much higher compression than the conventional engine. At the same time, a positive and accurately timed spark ignition is used without any risk of pre-ignition in the cylinder. The engine can idle on the small charge of fuel mixture supplied to the primary firing chamber, without any injection into the cylinder, whereas in other injection engines, it is very difficult, if not impossible, to inject a charge that is small enough for idling.

Owing to the high restriction of the port 12, the compression developed by the compression stroke of the piston will be much lower in the chamber 13 than in the chamber 11. Consequently, the mixture in the chamber 13 will not self-ignite, even though the engine is of the high compression type.

The flame from the chamber 13, which is very hot and is projected at a very high velocity into and across the top of the cylinder, is an extremely effective means for insuring substantially instantaneous combustion in the cylinder, so that the injection into the cylinder may be timed substantially the same as the spark is timed, or to take place just a little in advance of the spark.

It is of course to be understood that the specific structure herein shown and described is merely illustrative and that the invention also includes such modifications thereof as may be embraced within the scope of the appended claims.

Having thus described the invention, what I claim as new and desire to secure by Letters Patent, is:—

1. An internal combustion engine comprising a cylinder formed with a main combustion chamber at its upper end, a piston reciprocable in said cylinder, means for supplying air to the cylinder, a primary firing chamber having a constant restricted port opening laterally into the main combustion chamber, means for charging the primary firing chamber with normal fuel mixture, interconnected throttle valves synchronously controlling the volume of the charges to the two chambers, means for injecting liquid fuel directly into the main combustion chamber when the piston is near the end of its compression stroke, said restricted port being so small that the compression in the primary firing chamber at the end of the compression stroke is considerably lower than in the main combustion chamber, and means for igniting the mixture in the primary firing chamber when the piston is substantially in its uppermost position, whereby a flame is projected at a high velocity into and across the main combustion chamber and causes substantially instantaneous combustion in the latter.

2. An internal combustion engine comprising a cylinder including a main combustion chamber, a piston reciprocable in said cylinder, a primary firing chamber having a constant restricted port opening into the main combustion chamber, each of said chambers having an intake port and valve, means for supplying a throttled fuel mixture to the intake port of the primary firing chamber and air alone to the other intake port, mechanical means for opening said intake valves in timed relation to each other, means for injecting liquid fuel directly into the main combustion chamber on the side remote from said primary firing chamber, said restricted port being so small that the compression in the primary firing chamber at the end of the compression stroke is considerably lower than in the main combustion chamber, and means for electrically igniting the charge in the primary firing chamber, thereby projecting a flame into and across the main combustion chamber and causing substantially complete combustion of the charge therein.

MARION MALLORY.